United States Patent
Byon et al.

(10) Patent No.: US 9,844,994 B2
(45) Date of Patent: Dec. 19, 2017

(54) AIR CONDITIONER FOR VEHICLE

(71) Applicant: HALLA VISTEON CLIMATE CONTROL CORP., Daejeon (KR)

(72) Inventors: Sangchul Byon, Daejeon (KR); Hyungjoo Kim, Daejeon (KR); Dongmin Kam, Daejeon (KR); Seonghyun Kim, Daejeon (KR); Donggyun Kim, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 570 days.

(21) Appl. No.: 14/383,981

(22) PCT Filed: Oct. 30, 2013

(86) PCT No.: PCT/KR2013/009699
§ 371 (c)(1),
(2) Date: Sep. 9, 2014

(87) PCT Pub. No.: WO2014/069883
PCT Pub. Date: May 8, 2014

(65) Prior Publication Data
US 2015/0038067 A1 Feb. 5, 2015

(30) Foreign Application Priority Data

Oct. 30, 2012 (KR) .................. 10-2012-0120994
Oct. 30, 2012 (KR) .................. 10-2012-0120996
Oct. 29, 2013 (KR) .................. 10-2013-0129194

(51) Int. Cl.
*B60H 1/02* (2006.01)
*B60H 1/22* (2006.01)
*B60H 1/00* (2006.01)

(52) U.S. Cl.
CPC ..... *B60H 1/00035* (2013.01); *B60H 1/00021* (2013.01); *B60H 1/00207* (2013.01);
(Continued)

(58) Field of Classification Search
CPC ............ B60H 1/00035; B60H 1/00021; B60H 1/00207; B60H 1/00521; B60H 1/00692
See application file for complete search history.

(56) References Cited

U.S. PATENT DOCUMENTS 6,270,400 B1 * 8/2001 Tsurushima ....... B60H 1/00857
454/121
6,347,988 B1 * 2/2002 Kurokawa ......... B60H 1/00692
165/42

(Continued)

FOREIGN PATENT DOCUMENTS

JP     2007168522 A     7/2007
JP     2010036778       2/2010

(Continued)

*Primary Examiner* — Steven B McAllister
*Assistant Examiner* — Jonathan Cotov
(74) *Attorney, Agent, or Firm* — Dickinson Wright PLLC

(57) ABSTRACT

Disclosed therein is an air conditioner for a vehicle which includes a sealing member attached to one side of a door member of a mode door face-sealed with the inner face of an air-conditioning case by the inside wind pressure of the air-conditioning case so as to prevent vibration of the door member by wind pressure of the inside of the air-conditioning case and prevent air leakage from the face-sealed part, and which includes a rib formed on the door member for preventing excessive pressure of the sealing member in order to make actuating force of the door member uniform and to enhance a passenger's sense of manipulation.

8 Claims, 14 Drawing Sheets

(52) U.S. Cl.
CPC ..... *B60H 1/00521* (2013.01); *B60H 1/00692* (2013.01); *B60H 2001/00092* (2013.01); *B60H 2001/00214* (2013.01); *B60H 2001/00714* (2013.01)

(56) References Cited

U.S. PATENT DOCUMENTS

| | | | | |
|---|---|---|---|---|
| 7,794,314 | B2* | 9/2010 | Sekiya | B60H 1/00692 165/41 |
| 8,840,452 | B2* | 9/2014 | Han | B60H 1/00692 454/145 |
| 8,939,821 | B2* | 1/2015 | Monoi | B60H 1/00692 165/204 |
| 2001/0027861 | A1* | 10/2001 | Tsurushima | B60H 1/0005 165/201 |
| 2003/0145978 | A1* | 8/2003 | Tsurushima | B60H 1/00692 165/11.1 |
| 2003/0232590 | A1* | 12/2003 | Okumura | B60H 1/00692 454/121 |
| 2005/0142999 | A1* | 6/2005 | Uemura | B60H 1/00692 454/152 |
| 2006/0144582 | A1 | 7/2006 | Sekiya et al. | |
| 2009/0023374 | A1* | 1/2009 | Suzuki | B60H 1/00692 454/126 |
| 2009/0197517 | A1* | 8/2009 | Wang | B60H 1/00692 454/145 |
| 2010/0144263 | A1* | 6/2010 | Han | B60H 1/00678 454/155 |
| 2011/0059685 | A1* | 3/2011 | Ido | B60H 1/00692 454/69 |
| 2012/0180393 | A1* | 7/2012 | Suzuki | B60H 1/00692 49/348 |
| 2012/0208444 | A1* | 8/2012 | Han | B60H 1/00692 454/141 |
| 2013/0149953 | A1* | 6/2013 | Seto | B60H 1/00692 454/155 |

FOREIGN PATENT DOCUMENTS

| | | |
|---|---|---|
| KR | 20040006355 A | 1/2004 |
| KR | 20120088114 | 8/2012 |

* cited by examiner

Prior Art

AIR CONDITIONER FOR VEHICLE

TECHNICAL FIELD

The present invention relates to an air conditioner for a vehicle, and more particularly, to an air conditioner for a vehicle which includes a sealing member attached to one side of a door member of a mode door face-sealed with the inner face of an air-conditioning case by the inside wind pressure of the air-conditioning case.

BACKGROUND ART

In general, an air conditioner for a vehicle includes a cooling system for cooling the inside of the vehicle and a heating system for heating the inside of the vehicle.

The cooling system includes converts air blown from an air blower into cold air through heat exchange between refrigerant, which circulates a condenser, a receiver dryer, an expansion valve and an evaporator in order and returns to a compressor by operation of the compressor, and the blown air passing the surface of the evaporator by the air blower and discharges the cold air to the inside of the vehicle in order to cool the inside of the vehicle.

Moreover, the heating system introduces cooling water to a heater core and exchanges heat with the air blower in order to heat the inside of the vehicle.

Such an air conditioner for the vehicle is classified into three types.

One of the three types of the air conditioner is a three piece type air conditioner where a blower unit, an evaporator unit and a heater unit are disposed independently. However, such a three piece type air conditioner has various disadvantages in that it is deteriorated in utilization of the inside space of the vehicle because it is large-sized and in that it is deteriorated in productivity.

Therefore, in order to increase effectiveness of the inside space of the vehicle, a small-sized air conditioner for a vehicle is being demanded, and in response to such a demand, recently, a semi-center mounting type air conditioner where the blower unit and the heater unit are mounted integrally or a center mounting type air conditioner where the blower unit, the evaporator unit and the heater unit are mounted integrally is increasing in use.

FIG. 1 illustrates an example of a conventional semi-center type air conditioner, and in FIG. 1, the blower unit is not illustrated.

The air conditioner 1 for the vehicle shown in FIG. 1 includes: an air-conditioning case 10 having a defrost vent 11, a face vent 12 and a floor vent 13 which are formed at an outlet side and are air discharge ports of which the degree of openings are regulated by a mode door 14; a blower not shown) connected to an inlet side of the air-conditioning case 10 for sending inside air or outside air; an evaporator 2 and a heater core 3 that are mounted inside the air-conditioning case 10; and a temperature-adjusting door 20 for adjusting the degree of opening of a cold air passageway P1 which bypasses the heater core 3 and the degree of opening of a warm air passageway P2 which passes through the heater core 3.

The temperature-adjusting door 20 includes: a sliding door 21 which is mounted in sliding grooves 16 formed at both sides of the inside of the air-conditioning case 10 to be able to slide and has a gear part 21a formed on one side thereof; and a gear shaft 22 which is rotatably connected to a through holes (not shown) formed at both sides of the air-conditioning case 10 and has a gear part 22a gear-coupled with the gear part 21a of the sliding door 21 so as to operate the sliding door 21.

Furthermore, the mode door 14 has a structure similar with the structure of the temperature-adjusting door 20. In brief, the mode door 14 includes: a sliding door 14a connected to both sides of the inside of the air-conditioning case 10 to be able to slide; and a gear shaft 14b rotatably mounted at both sides of the inside of the air-conditioning case 10 and interlocking with the sliding door 14a so as to operate the sliding door 14a.

The temperature-adjusting door 20 and the mode door 14 are rotated by being connected to an actuator (not shown) mounted on the outer face of the air-conditioning case 10 so as to adjust the degree of opening of the cold air passageway P1 and the degree of opening of the warm air passageway P2 or to open and close the vents 11 to 13 and 15.

According to the air conditioner 1 having the above structure, in a case of the maximum cooling mode, the temperature-adjusting door 20 opens the cold air passageway P1 but closes the warm air passageway P2. Additionally, in a case of the maximum heating mode, the temperature-adjusting door 20 closes the cold air passageway P1 but opens the warm air passageway P2.

Therefore, in the maximum cooling mode, it blown by the blower (not shown) is converted into cold air by exchanging heat with refrigerant flowing inside the evaporator 2 while passing the surface of the evaporator 2, and then, flows toward a mixing chamber (MC) through the cold air passageway P1. After that, the cold air is discharged to the inside of the vehicle through the vent opened by the mode door 14 according to air discharge modes including a vent mode, a floor mode, a defrost mode, a bilevel mode and a mixing mode in order to cool the inside of the vehicle.

Moreover, in the maximum heating mode, the blown air is converted into warm air by exchanging heat with cooling water flowing inside the heater core 3 while passing through the heater core 3 through the warm air passageway P2, and then, flows toward the mixing chamber (MC). After that, the warm air is discharged, to the inside of the vehicle through the vent opened by the mode door 14 according to the air discharge mode in order to heat the inside of the vehicle.

In the meantime, in a case of the mixing mode, the temperature-adjusting door 20 is rotated to a neutral position, and opens all of the cold air passageway P1 and the warm air passageway P2. Therefore, cold air passing through the evaporator 2 and warm air passing through the heater core 3 flow toward the mixing chamber (MC) and are mixed together, and then, the mixed air is discharged to the inside of the vehicle through the vent opened by the mode door 14 according to the air discharge mode.

Furthermore, the air conditioner 1 prevents air leak between the inner face of the air-conditioning case 10 and the sliding door 14a because the sliding door 14a of the mode door 14 is compressed to the inner face of the air-conditioning case 10 by wind pressure of the inside of the air-conditioning case 10 so as to be face-sealed.

However, the conventional air conditioner 1 has a problem in that some of air leaks from the face-sealed part due to deformation of the inner face of the air-conditioning case 10 or the sliding door 14a even though the sliding door 14a is face-sealed with the inner face of the air-conditioning case 10.

Furthermore, because of the nature of the face sealing, because an interval between the sliding door 14a and the inner face of the air-conditioning case 10 is very small or the sliding door 14a gets in contact with the inner face of the air-conditioning case 10, the sliding door 14a is vibrated by air induction and wind pressure, and especially, an end portion of the sliding door 14a is intensified in vibration when it gets farther from the gear shaft 14b.

Technical Problem

Accordingly, the present invention has been made in an effort to solve the above-mentioned problems occurring in the prior arts, and it is an object of the present invention to provide an air conditioner for a vehicle which includes a sealing member attached to one side of a door member of a mode door face-sealed with the inner face of an air-conditioning case by the inside wind pressure of the air-conditioning case so as to prevent vibration of the door member by wind pressure of the inside of the air-conditioning case and prevent air leakage from the face-sealed part, and which includes a rib formed on the door member for preventing excessive pressure of the sealing member in order to make actuating force of the door member uniform and to enhance a passenger's sense of manipulation.

Technical Solution

To achieve the above objects, the present invention provides an air conditioner for a vehicle which includes: an air-conditioning case including an air inflow port formed at one side and a plurality of air outflow ports formed at the other side for discharging air introduced thereinto; and a door including a door member which is slidably mounted on the inner face of the air-conditioning case and a gear shaft which is rotatably mounted inside the air-conditioning case to operate the door member and interlocks with the door member, further including: a sealing member attached to one side of the door member which is face-sealed with an inner face of the air-conditioning case by wind pressure inside the air-conditioning case in order to prevent vibration of the door member and air leakage at the face-sealed portion.

Advantageous Effects

The air conditioner for the vehicle according to an embodiment of the present invention can prevent vibration of the door member by wind pressure of the inside of the air-conditioning case and prevent air leakage from the face-sealed part because including the sealing member attached to one side of the door member of the mode door face-sealed with the inner face of the air-conditioning case by the inside wind pressure of the air-conditioning case.

Moreover, the air conditioner for the vehicle according to the embodiment of the present invention can prevent excessive pressure of the sealing member, make actuating force of the door member uniform by compressing the sealing member at a proper compression ratio and enhance a passenger's sense of manipulation because including the rib formed on one side of the door member to which the sealing member is attached.

Furthermore, a baffle which is air resistance increasing means is protrudingly formed on the door member in such a manner that resistance of air flowing inside the air-conditioning case is applied in order to increase or decrease operating power of the gear shaft according to the sliding direction of the door member, thereby making operating power of the gear shaft, which is not uniform, uniform by self-weight of the door member when the door member is operated in the gravity direction or in the opposite direction to the gravity and making the passenger's sense of manipulation uniform to thereby solve dissatisfaction.

Additionally, in a case that the gear shaft is automatically manipulated by an actuator, because uniform operating power is applied to the actuator, durability and the lifespan of the actuator are increased.

In addition, because power that the door member gets in contact with the air-conditioning case is increased by air resistance applied to the air resistance increasing means, scalability between the air-conditioning case and the door member is enhanced.

MODE FOR INVENTION

Figure 1:
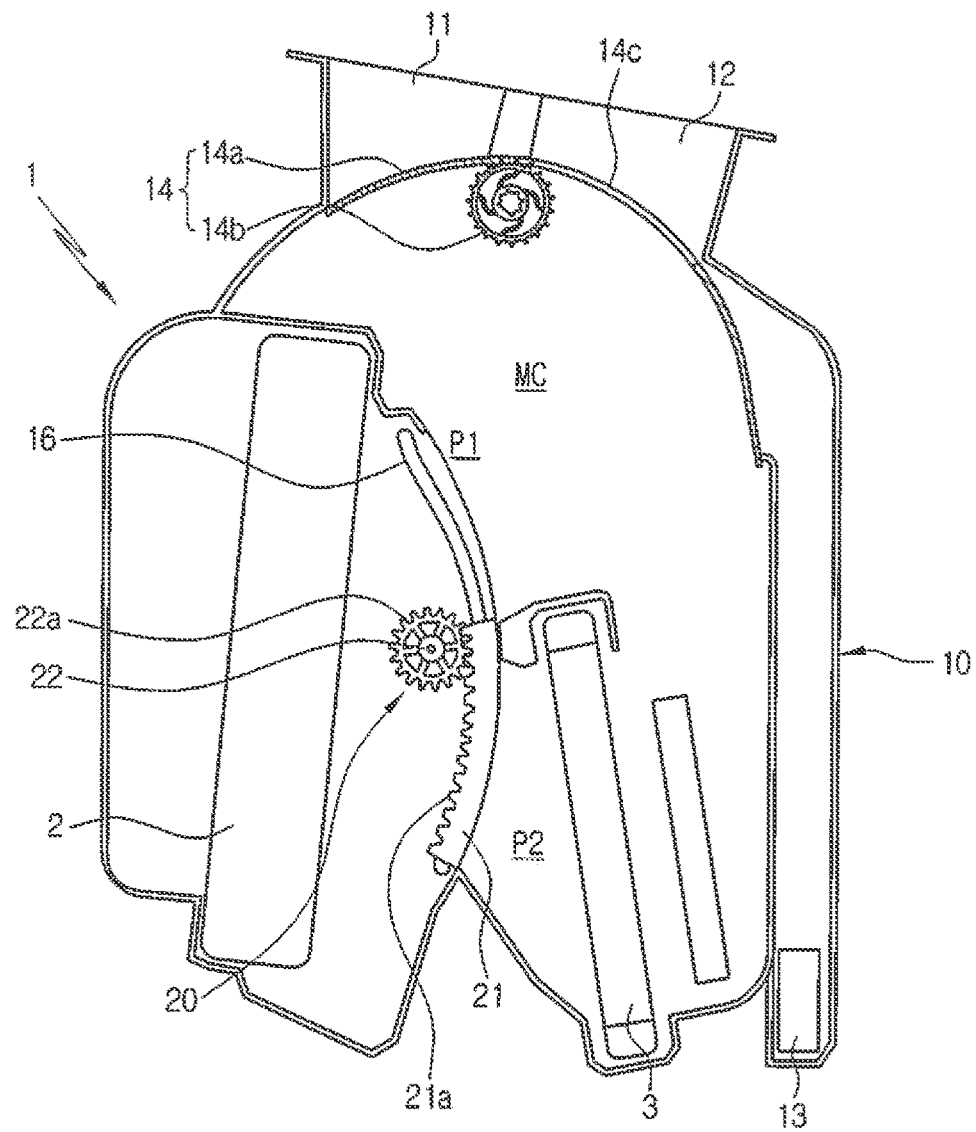
FIG. 1 is a sectional view of a conventional air conditioner for a vehicle.
Figure 2:
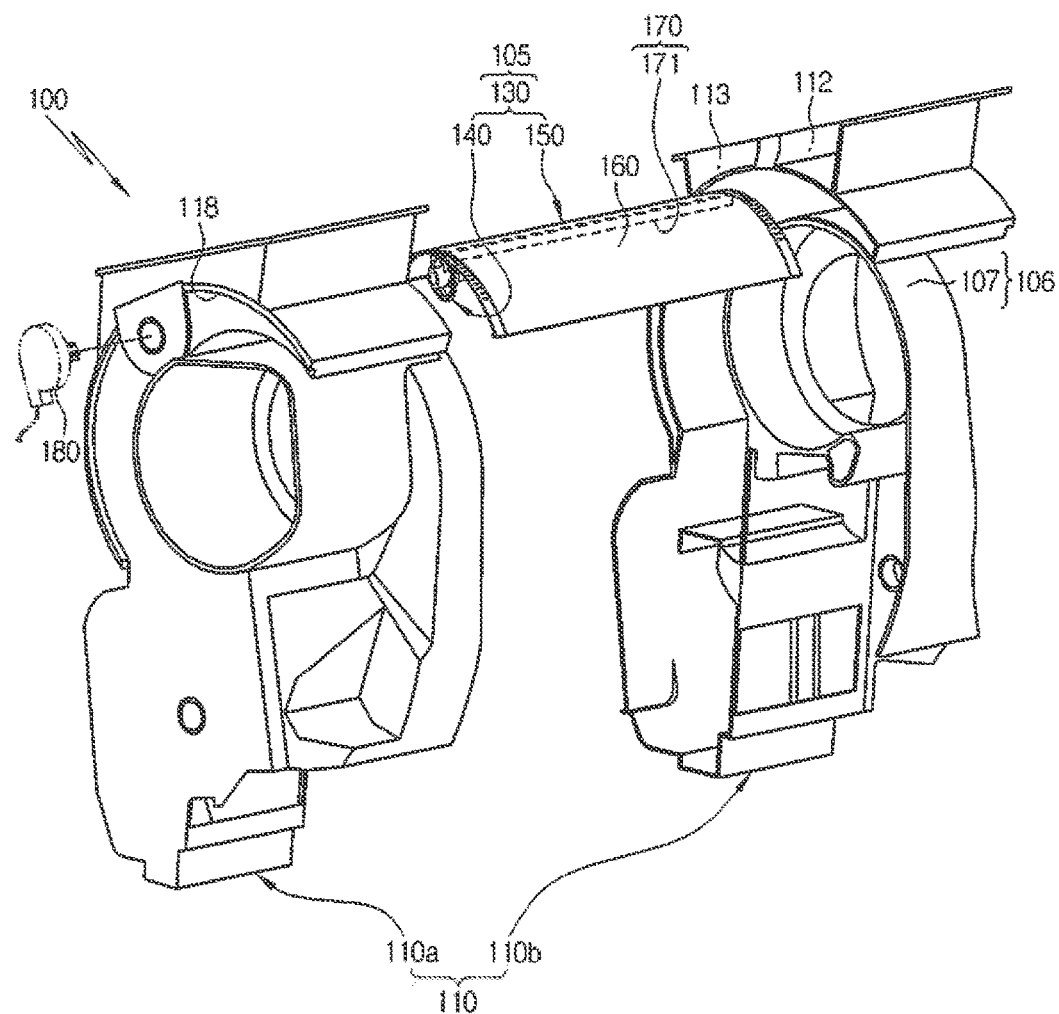
FIG. 2 is an exploded perspective view of an air conditioner for a vehicle according to a preferred embodiment of the present invention.
Figure 3:
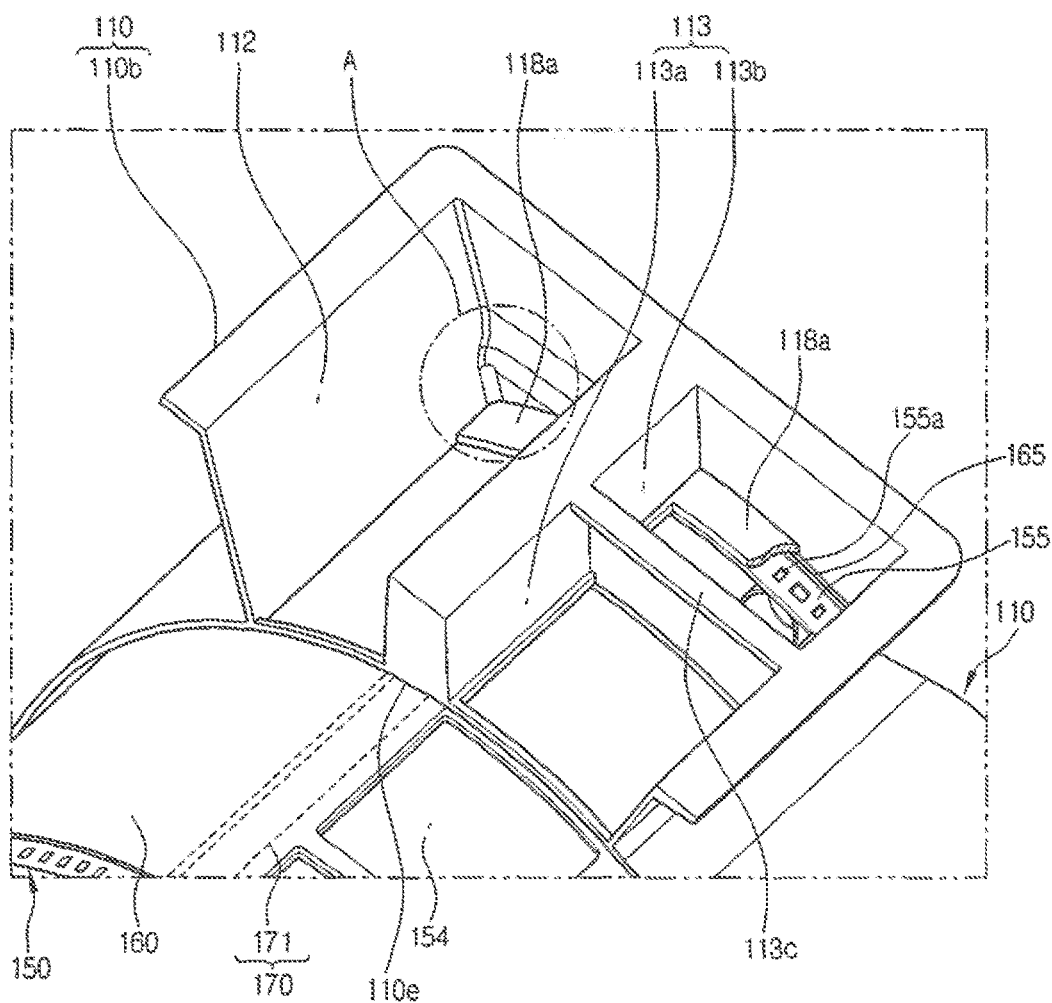
FIG. 3 is a partially perspective view showing an upper part of an air-conditioning case of the air conditioner for the vehicle according to the preferred embodiment of the present invention.
Figure 4:
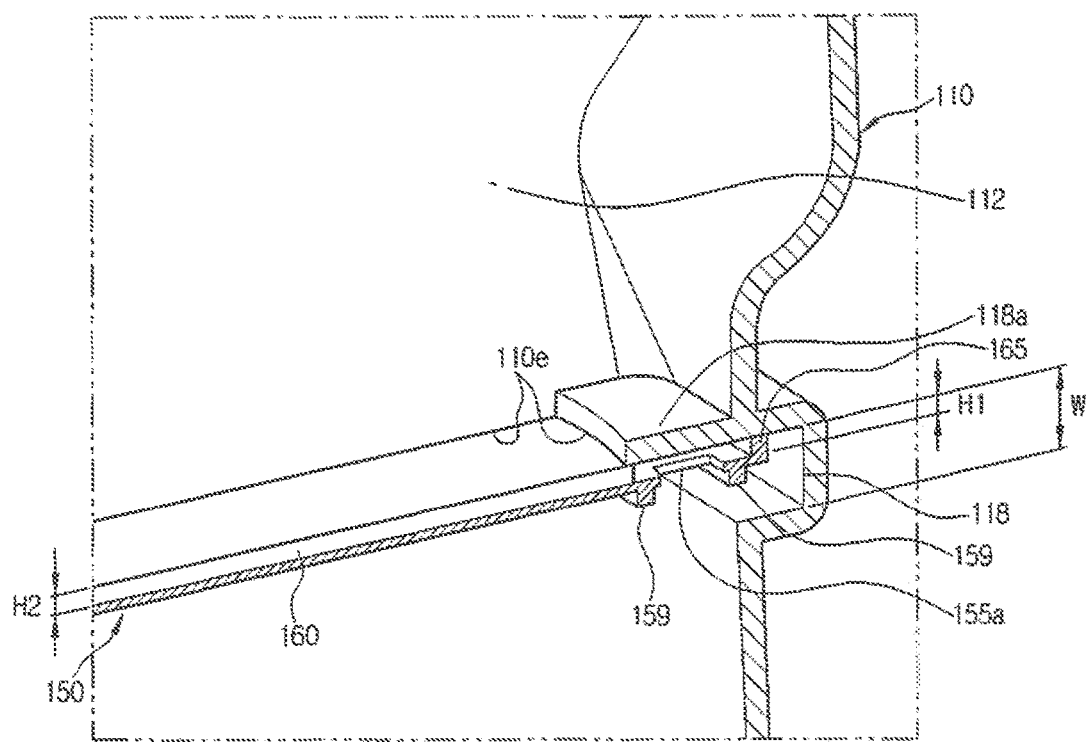
FIG. 4 is a sectional perspective view showing an "A" part of FIG. 3.
Figure 5:
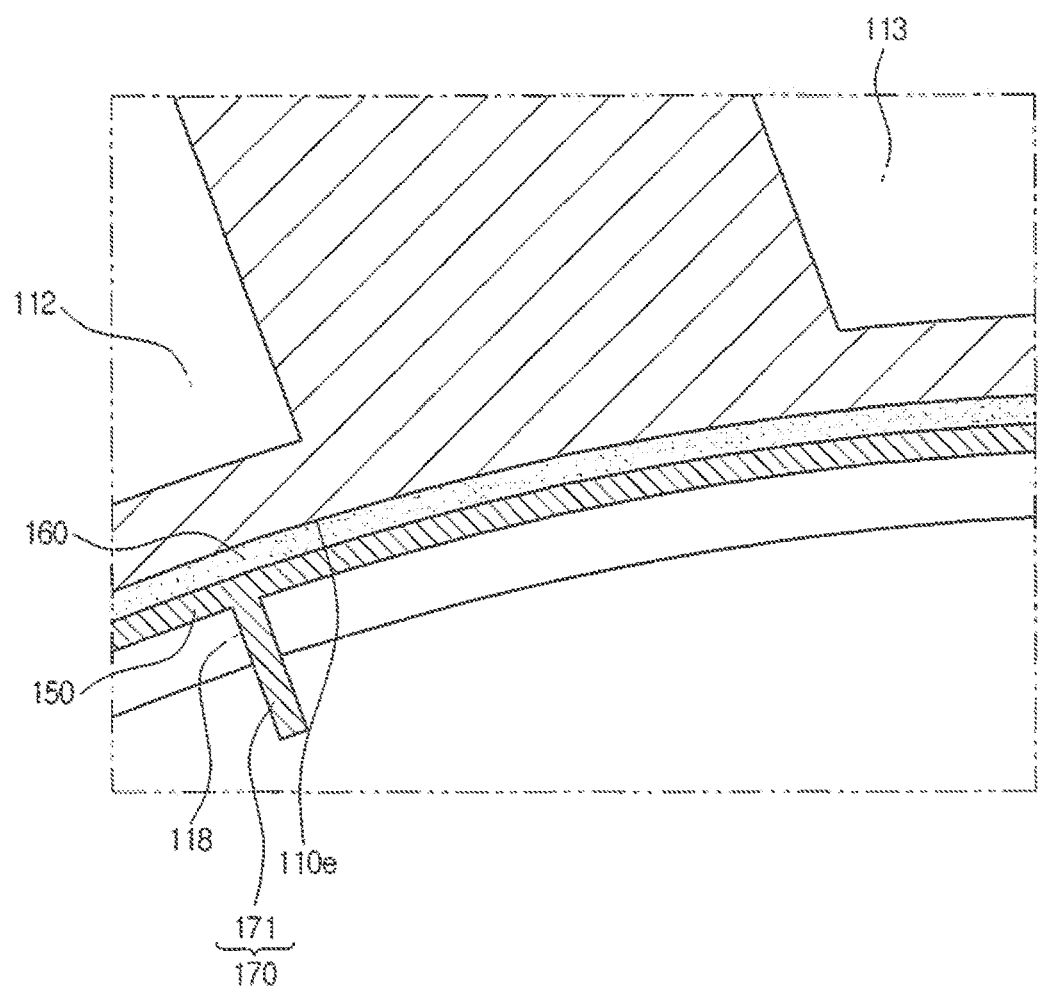
FIG. 5 is a sectional view showing a state where a sealing member of a door member is compressed to the inner face of the air-conditioning case of FIG. 3.
Figure 6:
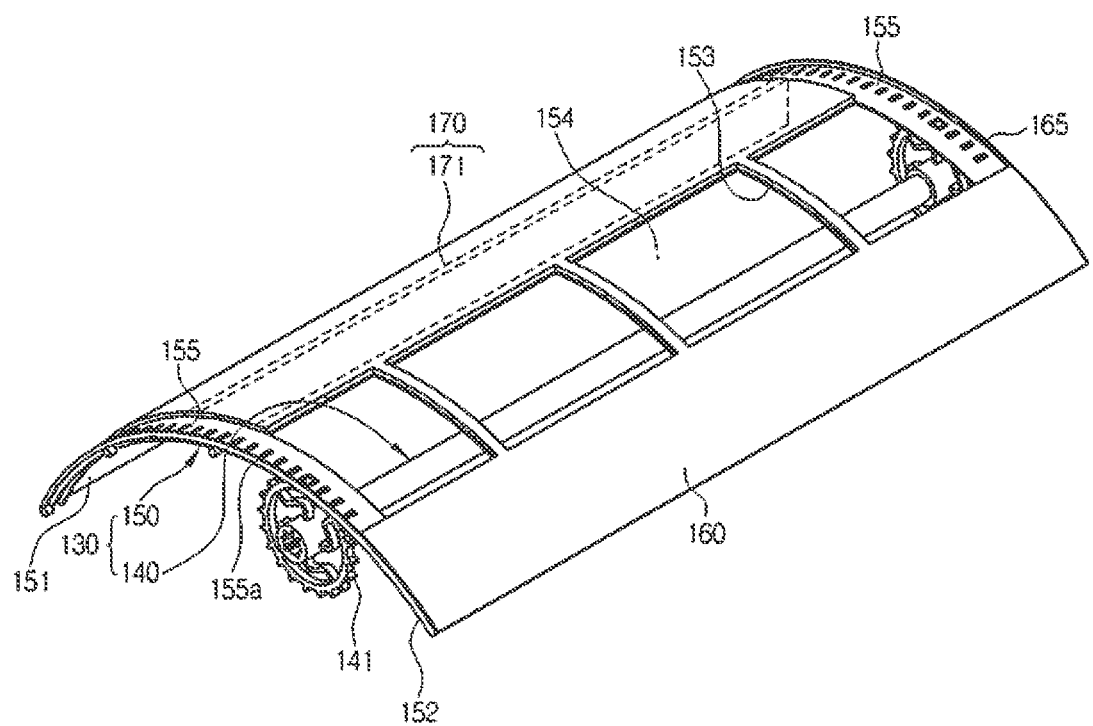
FIG. 6 is a perspective view of a mode door of the air conditioner for the vehicle according to the preferred embodiment of the present invention.
Figure 7:
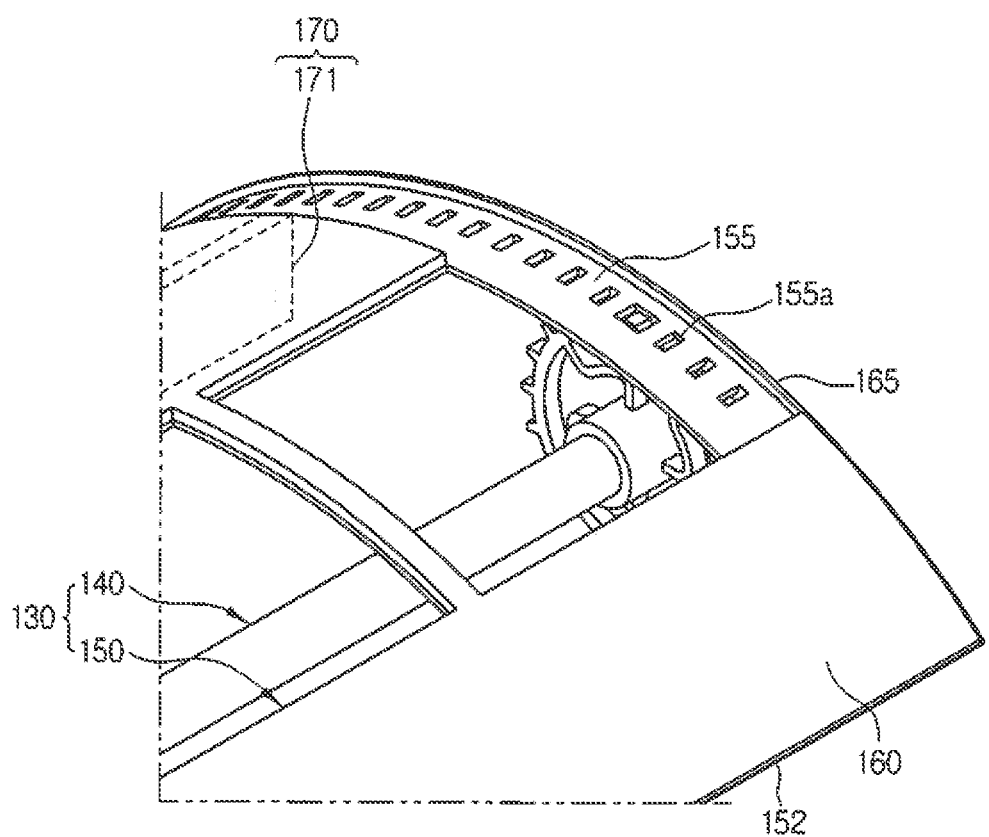
FIG. 7 is an enlarged perspective view of one side of the mode door of FIG. 6.
Figure 8:
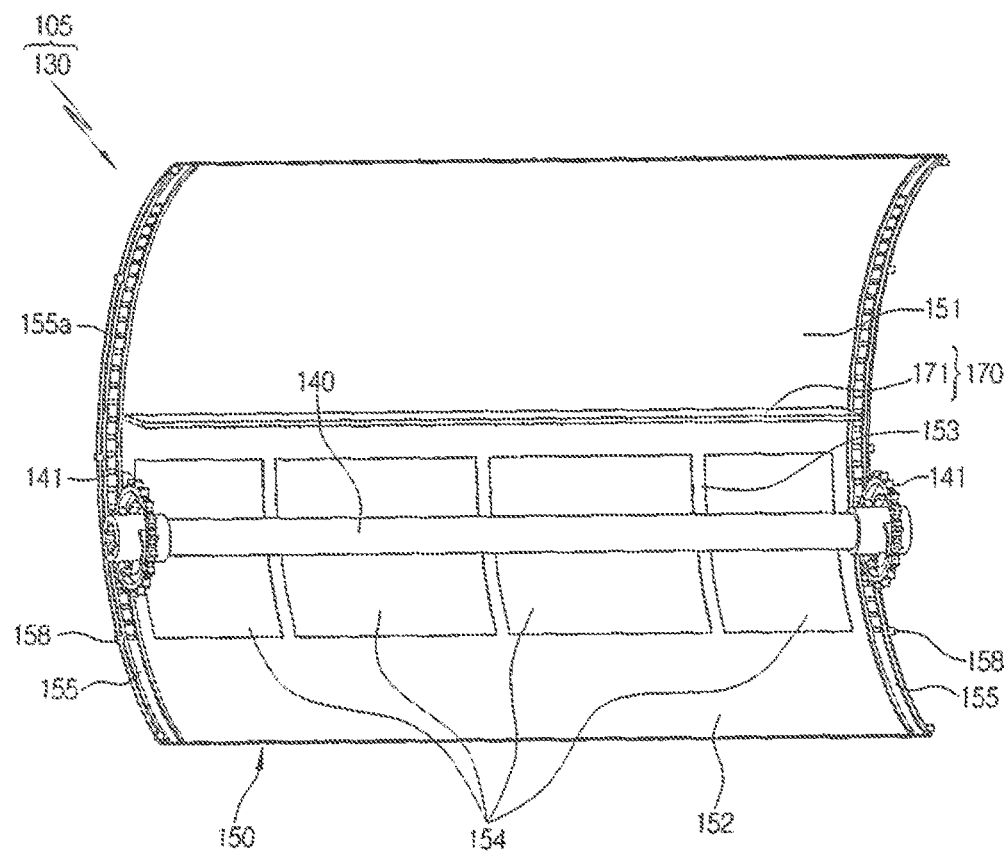
FIG. 8 is a perspective view seen from a position of a baffle in the mode door of the air conditioner for the vehicle according to the preferred embodiment of the present invention.

Hereinafter, reference will be now made in detail to the preferred embodiment of the present invention with reference to the attached drawings.

As shown in the drawings, an air conditioner 100 for a vehicle according to a preferred embodiment of the present invention includes an air-conditioning case 110 having an air inflow port 111 formed on one side (inlet side), a plurality of air discharge ports 116 formed on the other side (outlet side) for discharging introduced air, and an air passageway 110c formed therein to connect the air inflow port 111 with the air outflow ports 116; an evaporator 101 and a heater core 102 which are mounted on the air passageway 110c inside the air-conditioning case 110 at a predetermined interval; and a door 105 mounted on the air passageway 110c inside the air-conditioning case 110.

Here, the door 105 includes: a temperature-adjusting door 120 mounted on the air passageway 110c between the evaporator 101 and the heater core 102 inside the air conditioning case 110 in order to adjust the degree of opening of a cold air passageway P1 which bypasses the heater core 102 and the degree of opening of a warm air passageway P2 which passes through the heater core 102; and a mode door 130 mounted at a point where the air discharge ports 116 are branched from the air passageway 110c inside the air-conditioning case 110 to adjust the degree of opening of the air outflow ports 116.

Moreover, the air-conditioning case 110 is configured in such a way that left and right cases 110a and 110b which are separated left and right are assembled with each other, and in this instance, a lower case 110d may be assembled to lower portions of the left and right cases 110a and 110b in an integrated form.

Furthermore, an blowing device 106 is mounted at the air inflow port 111 of the air-conditioning case 110 which selectively induces inside air or outside air through an inside air inlet (not shown) and an outside air inlet (not shown) which are opened and closed by and inside and outside air converting door (not shown) to send air.

The air blowing device 106 includes: a scroll case 107 connected with the air inflow port 111 of the air-conditioning case 110; a blower 108 rotatably mounted inside the scroll case 107 to send air toward the air inflow port 111 of the air-conditioning case 110; and an intake duct (not shown) which is mounted at one side of the scroll case 107 and has the inside air inlet and the outside air inlet.

Additionally, the air discharge ports 116 includes: a defrost vent 112 for discharging air toward a front window of the vehicle; a face vent 113 for discharging air toward the face of a passenger who sits on the front seat; and floor vents 114 and 115 for discharging air toward the passenger's feet.

The face vent 113 is divided into a center vent 113a and side vents 113b, namely, has the center vent 113a which is formed at the central side of the inside of the face vent 113 to discharge air toward the center of the inside of the vehicle and the side vents 113b which are formed at both sides of the center vent 113a to discharge air toward both sides of the inside of the vehicle. In this instance, the center vent 113a and the side vents 113b are partitioned by a plurality of partitions 113c.

The floor vents 114 and 115 are divided into a front seat floor vent 114 for discharging air toward the feet of the passenger who sits on the front seat and a rear seat floor vent 115 for discharging air toward the feet of the passenger who sits on the rear seat.

Meanwhile, a partition wall 117 is formed between the warm air passageway P2 of the rear side of the heater core 102 and the floor vents 114 and 115 to partition the warm air passageway P2 and the floor vents 114 and 115.

In addition, the temperature-adjusting door 120 and the mode door 130 are operated by being connected to operating means 180, such as an actuator or a cable type controller, mounted on the outer face of the air-conditioning case 110 in order to adjust the degree of opening of the cold air passageway P1 and the warm air passageway P2 and the degree of opening of the vents 112 to 115.

Hereinafter, for convenience sake, as an example, the door 105 as the mode door 130 will be described, and it will be applied to the temperature-adjusting door 120 in the same way.

The mode door 130 includes a gear shaft 140 and a door member 150.

The gear shaft 140 is rotatably mounted at both sides of the inside of the air-conditioning case 110 and has gear parts 141 respectively formed at both end portions thereof. In this instance, end portions of the gear shaft 140 which are located more outside the gear part 141 are rotatably connected to both opposite sides inside the air-conditioning case 110.

The gear parts 141 of the gear shaft 140 interlock with gear grooves 155a formed in rail parts 155 of the door member 150 which will be described later.

Here, it is preferable that the gear shaft 140 be arranged below the face vent 113 of the air outflow ports 116. That is, the gear shaft 140 is arranged below the face vent 113 which is the middle of a movement path of the door member 150 slidably moving between the defrost vent 112 and the floor vents 114 and 115 so as to stably support the door member 150 all over the air discharge mode.

The door member 150 is formed in a curved shape and is slidably mounted on the inner face of the air conditioning case 110 in order to adjust the degree of opening of the vents 112 to 115 while slidably operating in interlock with the gear part 141 of the gear shaft 140.

In this instance, the door member 150 comes into contact with an inner face 110e of the air-conditioning case 110 from which the air discharge ports 116 are branched and adjusts the degree of opening of the defrost vent 112, the face vent 113 and floor vents 114 and 115 which are the air discharge ports 116 while operating to slide.

The rail parts 155 are formed at both end portions of the door member 150 to be slidably connected to both sides of the air-conditioning case 110 and each of the rail parts 155 includes the gear grooves 155a formed in the sliding direction of the door member 150 to interlock with the gear parts 141 of the gear shaft 140.

Moreover, the rail parts 155 respectively have guides 159 formed along both sides of the gear grooves 155a. The guides 159 prevent separation of the gear parts 141 of the gear shaft 140 interlocking with the gear grooves 155a.

Here, the guides are formed on the opposed side of ribs 155 which will be described later.

Furthermore, rail groove parts 118 are formed at both sides inside the air-conditioning case 110 opposed with the rail parts 155 of the door member 150 in order to support the end portions of the rail parts 155 to be able to slide.

In the meantime, because the air-conditioning case 110 is configured by assembly of the left and right cases 110a and 110b, the rail groove parts 118 are respectively formed in the inner faces of the left and right cases 110a and 110b which are opposed to the rail parts 155 of the door member 150.

Additionally, because the door member 150 and the grail groove parts 118 are formed to have the same diameter, when the gear shaft 140 rotates, the door member 150 slides along the rail groove parts 118 so as to adjust the degree of opening of the vents 112 to 115.

Additionally, because the door member 150 and the grail groove parts 118 are formed to have the same diameter, namely, the same curvature, when the door member 150 is operated to slide, it prevents deformation of the door member 150.

The door member 150 is injection-molded with a plastic material, and it is preferable that the thickness of the door member 150 be minimized unless it does not have any influence on operation and durability.

In addition, the door member 150 includes a first door part 151, a second door part 152 and a bridge part 153 which are formed integrally.

As described above, when the single door member 150 is used because the entire structure of the mode door 130 is simplified, the single door member 150 can reduce the number of components, weight and manufacturing costs, enhance durability, make the size of the air conditioner 100 be reduced, prevent bad smells due to inhabitation of molds, and is reusable (recycled).

Moreover, the first door part 151 is formed to close at least two vents of the defrost vent 112, the face vent 113 and the floor vents 114 and 115. That is, the first door part 151 is as long in the sliding direction as it can close the two adjacent vents at the same time, and of course, when the first door part 151 slides in the counterclockwise direction as much as possible, just one vent, namely, the defrost vent 112, is closed.

Meanwhile, it is preferable that the first door part 151 be formed to have the size to close the defrost vent 112 and the face vent 113 at the same time or to close the face vent 113 and the floor vents 114 and 115 at the same time.

The second door part 152 is spaced apart from the first door part 151 at a predetermined interval in the sliding direction and is formed to close at least one vent of the vents 112 to 115.

That is, the second door part 152 is as long in the sliding direction as it can close one vent of the vents 112 to 115, and in this instance, it is preferable that the second door part 152 be formed to have the size to close the floor vents 114 and 115.

As described above, the sliding direction length of the first door part 151 which has to close the two vents of the vents 112 to 115 is longer than the sliding direction length of the second door part 152 which has to close one vent of the vents 112 to 115.

Furthermore, the bridge parts 153 are formed to integrally connect the first door part 151 and the second door part 152 which are spaced apart from each other at the predetermined interval.

The bridge parts 153 are respectively formed at positions corresponding to the partition walls 113c formed to partition the center vent 113a and the side vents 113b inside the face vent 113.

Additionally, the door member 150 includes an opening part 154 formed between the first door part 151 and the second door part 152 to adjust the degree of opening of the vents 112 to 115 according to the sliding position of the door member 150.

The opening part 154 is formed by the bridge part 153 which connects the first door part 151 and the second door part 152, and is formed to be divided between the bridge parts 153.

In the meantime, it is preferable that the opening part 154 be formed to have the size to open one vent, and in this instance, in a case that the opening part 154 is located across the two vents, the opening part 154 can partially open the two vents.

Moreover, each of the rail groove parts 118 has a sealing wall 118a protrudingly formed on the inner face of the air-conditioning case 110 to cover the gear grooves 155a formed in the rail part 155 of the door member 150 in order to prevent air leakage through the gear grooves 155a of the door member 150.

In this instance, the sealing wall 118a is formed to get in contact with one side of the rail parts 155 of the door member 150 to close the gear grooves 155a of the door member 150.

Furthermore, in order to minimize friction between the rail groove parts 118 of the air-conditioning case 110 and the door member 150, a width (W) of the rail groove part 118 is greater than the thickness of the door member 150, and a plurality of friction reducing protrusions 158 which are seated on one side of the rail groove part 118 are formed at one side of the rail part 155 of the door member 150 inserted into the rail groove part 118.

In this instance, the friction reducing protrusions 158 are spaced apart from one another at predetermined intervals along the rail part 155 of the door member 150 and are formed on the bottom side of the rail part 155.

Therefore, when the door member 150 is operated to slide, the friction reducing protrusions 158 formed on the bottom side of the rail part 155 of the door member 150 come into line contact with one side of the rail groove part 118 so as to minimize friction between the door member 150 and the rail groove part 118 and to reduce a load of the actuator which operates the door member 150 and the gear shaft 140.

Additionally, the door member 150 is face-sealed while getting in contact with the inner face 110e of the air-conditioning case 110 by wind pressure of air flowing inside the air-conditioning case 110 so as to prevent air leakage.

That is, the upper face (curved side) of the door member 150 gets in contact with the inner face 110e of the air-conditioning case 110 by wind pressure acting inside the air-conditioning case 110 and is face-sealed, and in other words, the upper face (curved side) of the door member 150 and the inner face 110e of the air-conditioning case 110 opposed to the upper face are face-sealed with each other.

Therefore, in the present invention, in order to prevent air leakage at the face-sealed portion due to deformation of the door member 150 or the inner face 110e of the air-conditioning case 110 face-sealed with the door member 150 and to prevent vibration of the door member 150 by wind pressure or air flow inside the air-conditioning case 110, a sealing member 160 is attached to one side of the door member 150 which is face-sealed with the inner face 110e of the air-conditioning case 110.

Here, the sealing member 160 is attached to the rear side of the door member 150 in the air flow direction inside the air-conditioning case 110 and comes into contact with the inner face 110e of the air-conditioning case 110 in which the air discharge ports 116 are located.

Moreover, it is preferable that the sealing member 160 be attached just to the face-sealed portion of the door member 150 which gets in contact with the inner face 110e of the air-conditioning case 110, and in this instance, it is preferable that the sealing member 160 be attached to the outside area of the gear grooves 155a of one side of the door member 150.

That is, the gear parts 141 of the gear shaft 140 interlock with the gear grooves 155a of the door member 150, and in this instance, because gear teeth of the gear parts 141 penetrate the gear grooves 155a to a predetermined length, it is preferable that the sealing member 160 be omitted at the gear grooves 155a of the door member 150.

As described above, because the sealing member 160 is attached to one side of the door member 150 which is face-sealed with the inner face 110e of the air-conditioning case 110, it can prevent air leakage through the face-sealed portion between the inner face 110e of the air-conditioning case 110 and the door member 150 and prevent vibration of the door member 150 even though there is wind pressure or air flow inside the air-conditioning case 110.

Additionally, the ribs 165 are protrudingly formed at one side of the door member 150 to prevent excessive pressure of the sealing member 160 by wind pressure inside the air-conditioning case 110.

The ribs 165 may be formed at various positions of one side of the door member 150 to which the sealing member 160 is attached, but, as shown in the drawing, it is preferable that the ribs 165 be formed at both end portions of the door member 150 where the sealing member 160 is omitted.

In this instance, the ribs 165 are formed at both end portions of the door member 150 in the sliding direction of the door member 150, and it is preferable that a height (H1) of the rib 165 be equal to or smaller than a height (H2) of the sealing member 160.

Here, if the height (H1) of the rib 165 is higher than the height (H2) of the sealing member 160, there is no face sealing.

Therefore, when wind pressure acts inside the air-conditioning case 110, the door member 150 moves toward the inner face 110e of the air-conditioning case 110, and the sealing member 160 attached to the door member 150 is compressed to the inner face 110e of the air-conditioning case 110, and in this instance, when the ribs 165 touch the inner face 110e of the air-conditioning case 110, it prevent excessive pressure of the sealing member 160.

As described above, the ribs 165 formed on the door member 150 prevent excessive pressure of the sealing member 160 and make operating power of the door member 150 uniform by compressing the sealing member 160 at a proper compression ratio, and hence, can enhance the passenger's sense of manipulation of the mode door 130.

In addition, when the door member 150 slides vertically, the sealing member 160 and the ribs 165 which are formed at one side of the door member 150 can keep the interval between the inner face 110e of the air-conditioning case 110 and the door member 150 uniform so as to make the passenger's sense of manipulation uniform.

Moreover, when the operating power of the door member 150 is uniform, in a case that the actuator operates the gear shaft 140, a load of the actuator is reduced more, so that the lifespan of the air conditioner is extended.

Furthermore, the mode door 130 adjusts the degree of opening of the vents 112 to 115 according to the air discharge modes while the door member 150 is operated to slide at the same angle as the gear shaft 140 rotated at a predetermined angle.

Referring to FIGS. 11 to 15, the door member 150 opens the face vent 113 through the opening part 154 while being located at the uppermost part in a vent mode of the air discharge modes, and opens the defrost vent 112 while being located at the lowermost part in a defrost mode.

As described above, the door member 150 opens the vents 112 to 115 respectively while sliding by the predetermined angle in the vertical direction according to the air discharge modes.

Additionally, air resistance increasing means 170 to which resistance of air flowing inside the air-conditioning case 110 is applied is formed on the door member 150 to increase or decrease operating power of the gear shaft 140, which operates the door member 150 according to the sliding direction of the door member 150, thereby making operating power of the gear shaft 140 uniform.

That is, when the air discharge mode is changed from the vent mode to the defrost mode, the door member 150 is operated to slide from the upper part to the lower part, in other words, in a case that the door member 150 slides in the gravity direction, operating power applied to the gear shaft 140 is reduced by self-weight of the door member 150.

On the contrary, when the air discharge mode is changed from the defrost mode to the vent mode, the door member 150 is operated to slide from the lower part to the upper part, in other words, in a case that the door member 150 slides in the opposite direction to the gravity, operating power applied to the gear shaft 140 is increased by self-weight of the door member 150.

Figure 9:
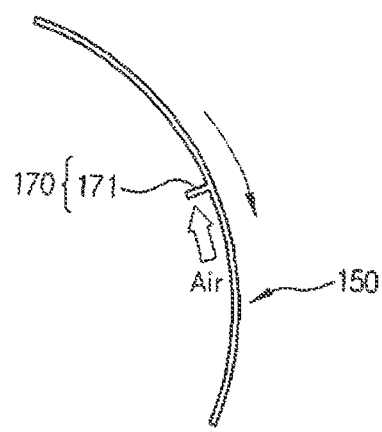
FIG. 9 is a view showing a case that the door member is actuated in the direction of gravity in the air conditioner for the vehicle according to the preferred embodiment of the present invention.
Figure 10:
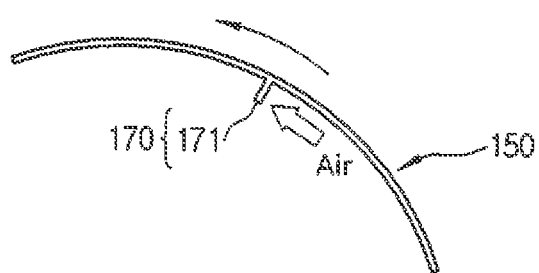
FIG. 10 is a view showing a case that the door member is actuated in the opposite direction to gravity in the air conditioner for the vehicle according to the preferred embodiment of the present invention.

Therefore, the present invention uses resistance of air applied to the air resistance increasing means 170 when the door member 150 is operated. When the door member 150 is operated in the gravity direction, as shown in FIG. 9, the operational direction of the door member 150 is opposed to the flow direction of air, and in this instance, due to operation repulsive power, operating power of the gear shaft 140 which operates the door member 150 is increased. However, when the door member 150 is operated in the opposite direction to the gravity, as shown in FIG. 10, the operational direction of the door member 150 and the flow direction of air coincide with each other, and hence, due to operation aiding power, operating power of the gear shaft 140 which operates the door member 150 is decreased.

In other words, by self-weight of the door member 150, operating power is increased using air resistance (operation repulsive power) applied to the air resistance increasing means 170 as much as operating power of the gear shaft 140 reduced when the door member 150 is operated in the gravity direction, but is decreased using air resistance (operation aiding power) applied to the air resistance increasing means 170 as much as operating power of the gear shaft 140 increased when the door member 150 is operated in the opposite direction to the gravity, such that operating power of the gear shaft 140 can be kept uniformly regardless of the sliding direction of the door member 150.

When operating power of the gear shaft 140 is kept uniformly, it can solve dissatisfaction because the passenger feels a sense of uniform manipulation in a case that the passenger manually manipulates the gear shaft 140 through a cable type controller, and uniform operating power is applied to the actuator in a case that the passenger automatically manipulates the gear shaft 140 through the actuator, such that durability and lifespan of the actuator are increased.

Additionally, the air resistance increasing means 170 is configured in such a way that a baffle 171 is protrudingly formed at one side of the door member 150 against which air flowing inside the air-conditioning case 110 collides.

The baffle 171 protrudes on onside of the door member 150, to which the gear shaft 140 is assembled, to a predetermined height. It is preferable that the baffle 171 have a height lower than an interval between the door member 150 and the gear shaft 140 to prevent interference between the door member 150 and the gear shaft 140 when the door member 150 slides.

Moreover, a longitudinal direction width of the baffle 171 is smaller than a width of the door member 150, and as shown in the drawing, it is preferable that the baffle 171 be formed between the rail parts 155 formed at both end portions of the door member 150.

As described above, when the baffle 171 is formed between the rail parts 155 of the door member 150, the baffle 171 is not interfered with the gear parts 141 of the gear shaft 140.

The baffle 171 is formed at right angles to the air flow direction inside the air-conditioning case 110. That is, when the baffle 171 is formed at right angles to the air flow direction inside the air-conditioning case 110, air resistance applied to the baffle 171 is minimized, and hence, the size of the baffle 171 can be reduced.

Furthermore, the baffle 171 is formed on the first door part 151 which is formed at the upper side based on the opening part 154 of the door member 150, such that resistance of air flowing inside the air-conditioning case 110 is applied smoothly regardless of the air discharge modes.

Meanwhile, the baffle 171 formed at one side of the door member 150 can be changed in its position, form, size, height and thickness.

Additionally, when the baffle 171 is protrudingly formed on the door member 150, power to make the door member 150 get in contact with the air-conditioning case 110 is increased to enhance sealability.

In the meantime, the temperature-adjusting door 120 of the door 105 which is mounted between the evaporator 101 and the heater core 102 includes a gear shaft 121 and a door member 122 like the mode door 130 in order to reduce the size of the air conditioner 100. That is, the temperatures adjusting door 120 includes: the gear shaft 121 rotatably mounted by both sides inside the air-conditioning case 110; and the door member 122 interlocked with the gear shaft 121 to adjust the degree of opening of the cold air passageway P1 and the warm air passageway P2 while vertically sliding inside the air-conditioning case 110 when the gear shaft 121 is rotated.

In addition, the structure that the sealing member 160 or the baffle 171 is attached to the door member 150 of the mode door 130 may be applied to the temperature-adjusting door 120 in the same way.

Hereinafter, the air discharge modes of the air conditioner according to the preferred embodiment of the present invention will be described, and for convenience sake, the air discharge modes will be described based on the cooling mode.

Vent Mode

Figure 11:
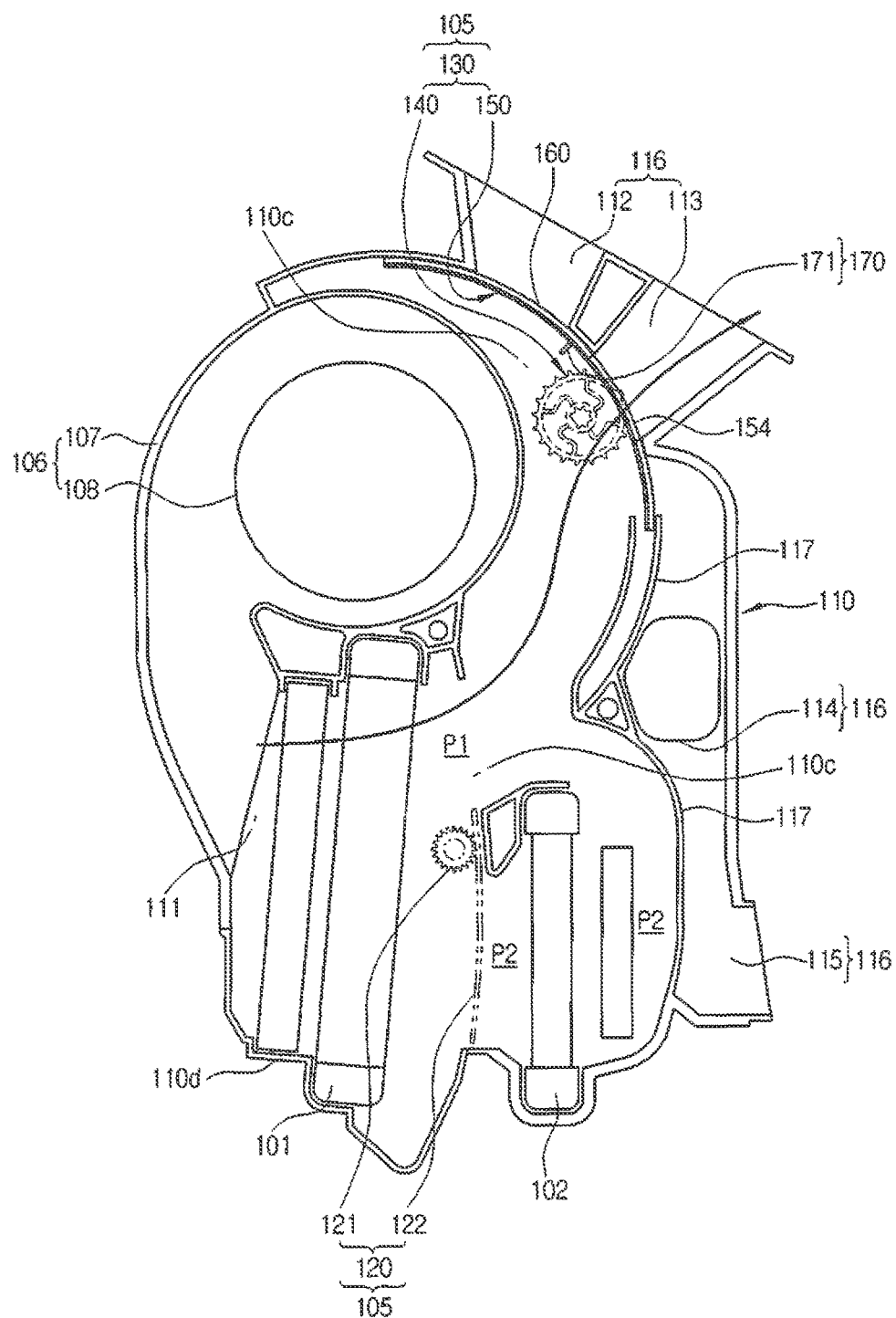
FIGS. 11 to 15 are views showing operational states of the mode door by air discharge modes in the air conditioner for the vehicle according to the preferred embodiment of the present invention.

As shown in FIG. 11, in the vent mode, by rotation of the gear shaft 140, the first door part 151 of the door member 150 closes the defrost vent 112 and the second door part 152 closes the floor vents 114 and 115, and in this instance, the opening part 154 of the door member 150 opens the face vents 113 while being located at the face vent 113.

Therefore, air blown by the air blowing device 106 is converted into cold air while passing through the evaporator 101.

The cold air cooled while passing through the evaporator 101 bypasses the heater core 102 by the temperature-adjusting door 120, and then, is discharged toward the face of the passenger who sits inside the vehicle through the face vent 113 opened by the door member 150.

B. Floor Mode

Figure 12:
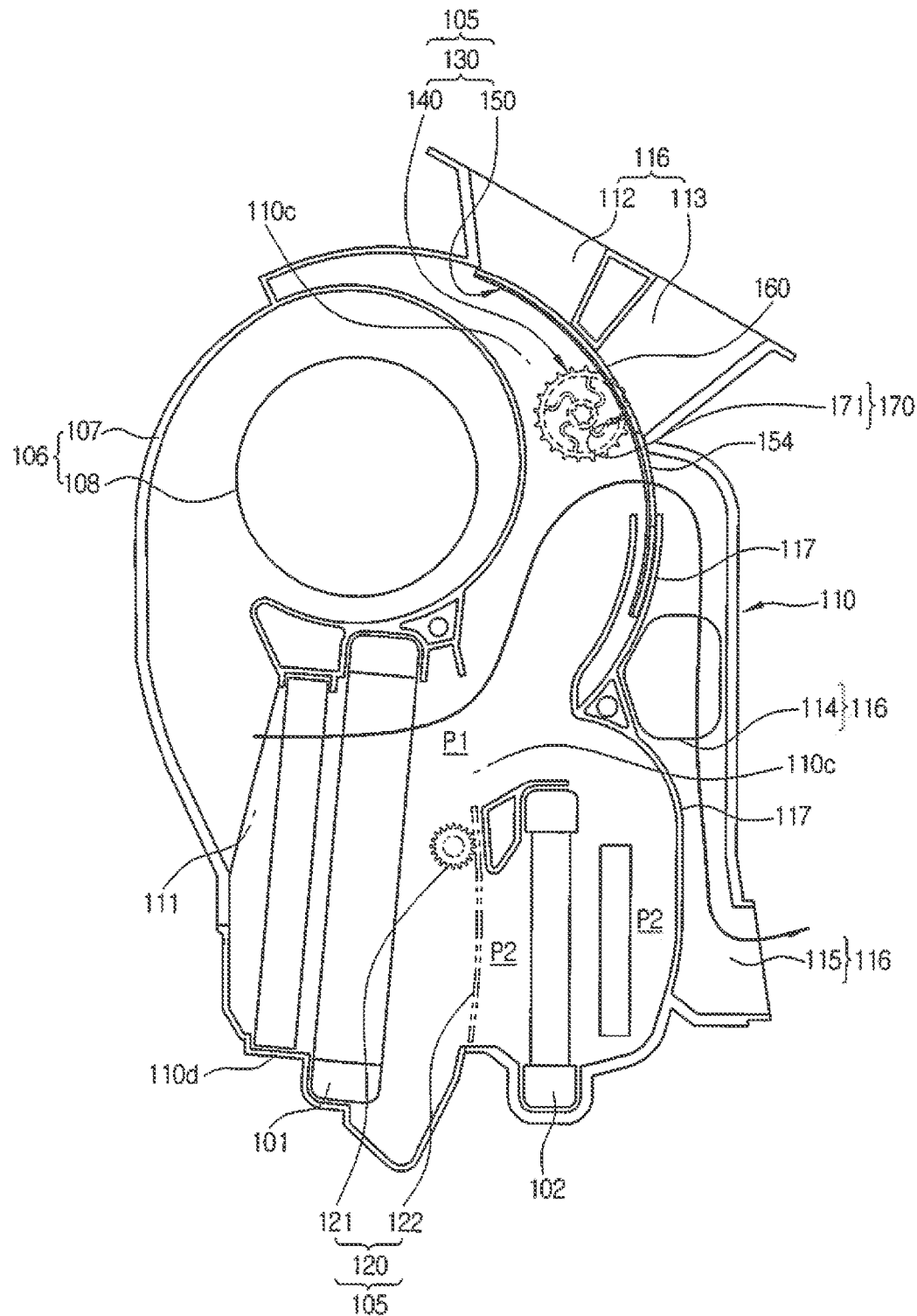

As shown in FIG. 12, in the floor mode, when the gear shaft 140 rotates at a predetermined angle from the vent mode position in the clockwise direction, the first door part 151 of the door member 150 simultaneously closes the defrost vent 112 and the face vent 113, and in this instance, the opening part 154 of the door part 150 opens the floor vents 114 and 115 while being located at the floor vents 114 and 115.

Here, the second door part 152 lowers to a position where it is overlapped with the partition wall 117.

Therefore, the air blown by the air blowing device 106 is converted into cold air while passing through the evaporator 101.

The cold air cooled while passing through the evaporator 101 bypasses the heater core 102 by the temperature-adjusting door 120, and then, is discharged toward the face of the passenger who sits inside the vehicle through the floor vents 114 and 115 opened by the door member 150.

C. Defrost Mode

Figure 13:
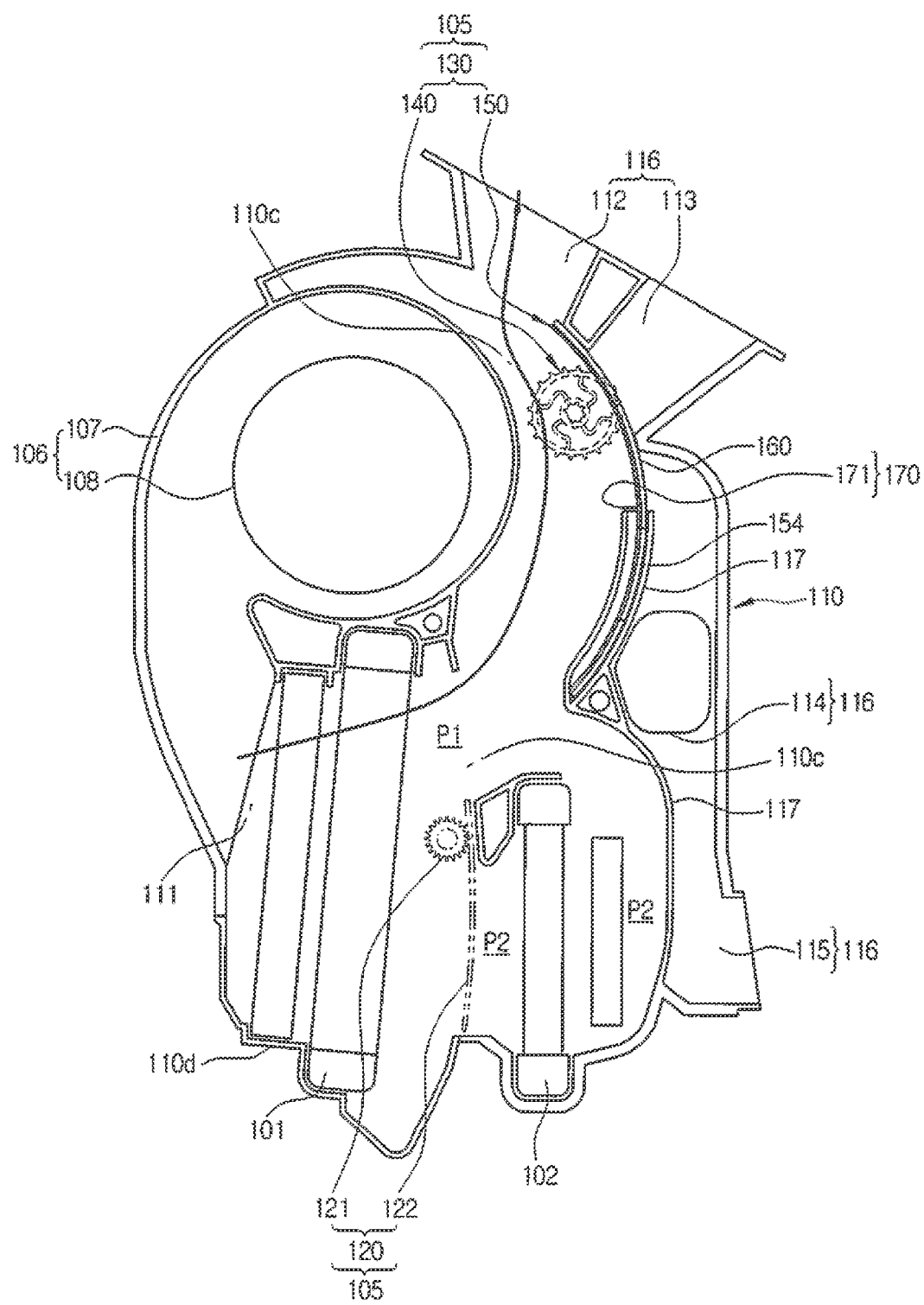

As shown in FIG. 13, in the defrost mode, when the gear shaft 140 rotates more at a predetermined angle from the floor mode position in the clockwise direction, the first door part 151 of the door member 150 simultaneously closes the face vent 113 and the floor vents 114 and 115, and in this instance, because the first door part 151 gets out of the defrost vent 112, the defrost vent 112 is opened.

Here, the second door part 152 and the opening part 154 lower to a position where it is overlapped with the partition wall 117.

Therefore, the air blown by the air blowing device 106 is converted into cold air while passing through the evaporator 101.

The cold air cooled while passing through the evaporator 101 bypasses the heater core 102 by the temperature-adjusting door 120, and then, is supplied toward the window inside the vehicle through the defrost vent 112 opened by the door member 150 in order to defrost.

D. Bi-Level Mode and Mixing Mode

Figure 14:
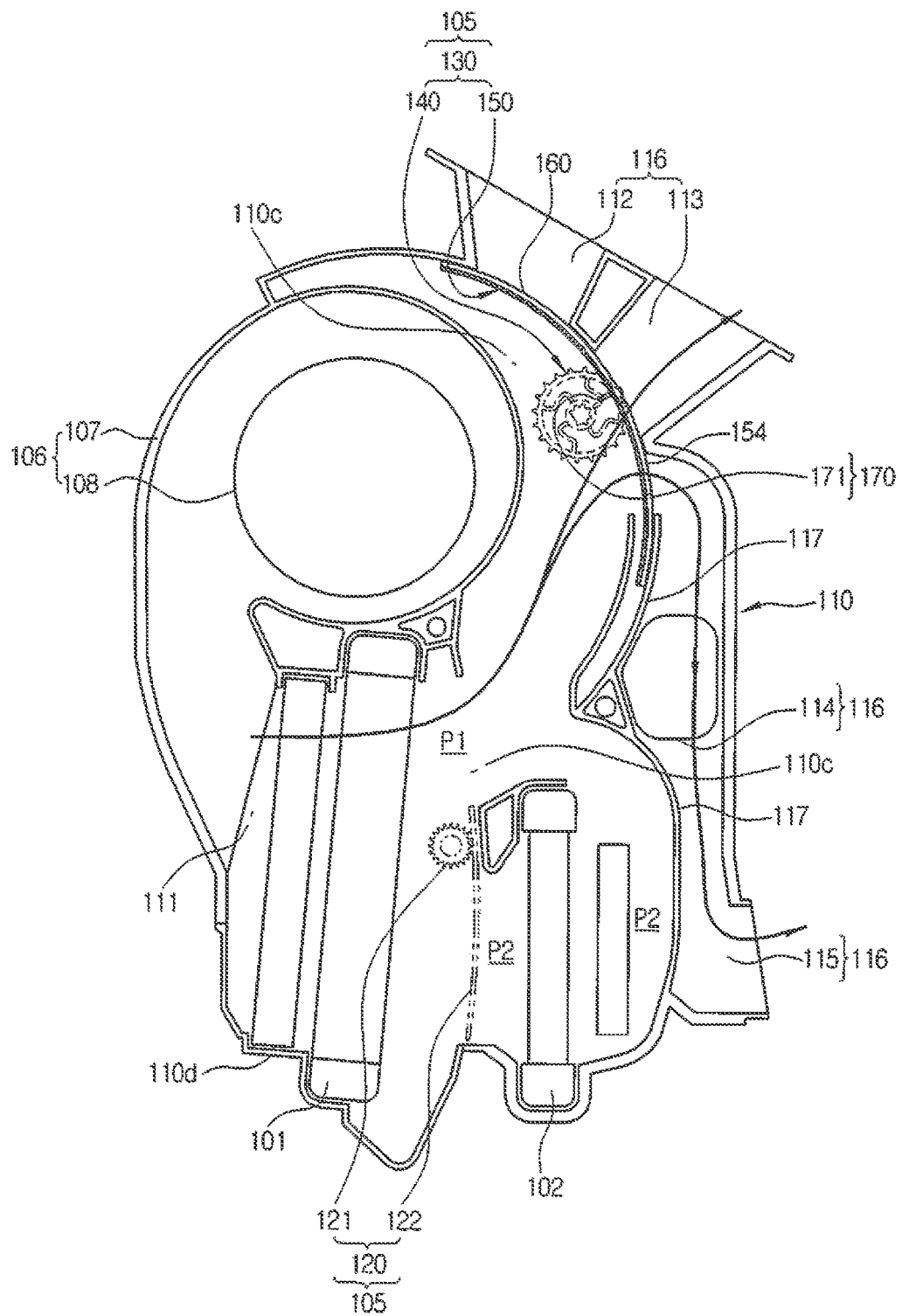

Referring to FIG. 14, the bilevel model will be described in brief. The opening part 154 of the door member 150 is located across the face vent 113 and the floor vents 114 and 115, and hence, in the bi-level mode, the opening part 154 opens the face vent 113 and the floor vents 114 and 115 at the same time.

Figure 15:
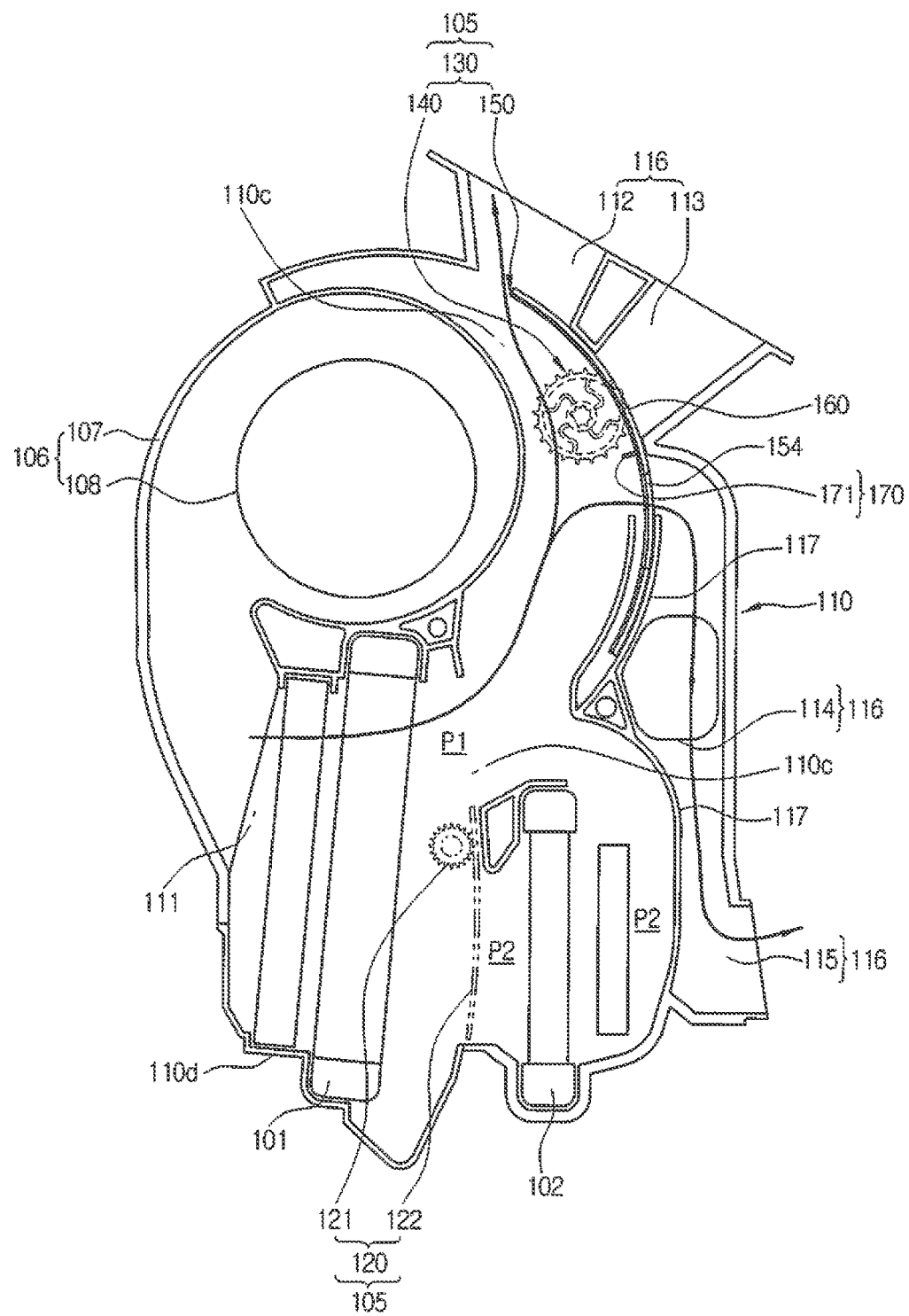

As shown in FIG. 15, because the center of the first door part 151 of the door member 150 is located at the face vent side, and hence, in the mixing mode, the face vent 113 is closed but the defrost vent 112 and the floor vents 114 and 115 are opened at the same time.

As described above, the structure that the sealing member 160, the ribs 165 and the baffle 171 are formed on the door member 150 is applied to the center-mounting type air conditioner, but the present invention is not limited to the above, and can be applied to various air conditioners, such as semi-center type air conditioners, three-piece type air conditioners, and left and right independent control type air conditioners, in the same way to obtain the same effects.

The invention claimed is:

1. An air conditioner for a vehicle which comprises:
   an air-conditioning case defining an inner face and including an air inflow port formed at one side and a plurality of air outflow ports formed at the other side for discharging air introduced thereinto;
   a door including a door member which is slidably mounted on the inner face of the air-conditioning case, said door member having a first side facing the air-conditioning case and extending between a pair of end portions;
   a gear shaft which is rotatably mounted inside the air-conditioning case to operate the door member and interlocks with the door member;
   the door member defining a plurality of gear grooves formed in a sliding direction of the door member adjacent to the end portions to interlock with the gear shaft;
   a sealing member attached to the first side of the door member and covering substantially an entirety of the first side of the door member except for an area adjacent the gear grooves, to be sealingly face-contacted with the inner face of the air-conditioning case by wind pressure inside the air-conditioning case in order to prevent vibration of the door member and air leakage at the face-sealed portion; and
   at least one rib protruding from the first side of the door member in the area which the sealing member is omitted to prevent excessive pressure of the sealing member by wind pressure inside the air-conditioning case;

wherein a height of the rib is equal to or smaller than a height of the sealing member.

2. The air conditioner according to claim 1, wherein the at least one rib includes a pair of ribs each formed adjacent to one of the end portions of the door member and extending in the sliding direction of the door member.

3. The air conditioner according to claim 1, wherein the door is a mode door for adjusting the degree of opening of a plurality of the air discharge ports by sliding the door member according to air discharge modes.

4. The air conditioner according to claim 1, wherein air resistance increasing means is formed on the door member in such a way that resistance of air flowing inside the air-conditioning case is applied, so as to increase or decrease operating power of the gear shaft operating the door member according to the sliding direction of the door member to thereby make operating power of the gear shaft uniform.

5. The air conditioner according to claim 4, wherein the air resistance increasing means is configured in such a manner that a baffle is protrudingly formed on one side of the door member against which the air flowing inside the air-conditioning case collides.

6. The air conditioner according to claim 5, wherein the baffle is formed at right angles to the air flow direction inside the air-conditioning case.

7. The air conditioner according to claim 5, wherein a longitudinal direction width of the baffle is smaller than a width of the door member.

8. The air conditioner according to claim 5, wherein the door is a mode door for adjusting the degree of opening of a plurality of the air discharge ports by sliding the door member according to air discharge modes,
 the door member is formed in a curved shape and includes an penetrated opening part formed to adjust the degree of opening of a plurality of the air discharge ports, and
 the baffle is formed on the door part to close a plurality of vents based on the opening part of the door member.

* * * * *

UNITED STATES PATENT AND TRADEMARK OFFICE
CERTIFICATE OF CORRECTION

PATENT NO. : 9,844,994 B2
APPLICATION NO. : 14/383981
DATED : December 19, 2017
INVENTOR(S) : Sangchul Byon et al.

It is certified that error appears in the above-identified patent and that said Letters Patent is hereby corrected as shown below:

In the Specification

In Column 1, Line 52, please change "not" to --(not--.
In Column 2, Line 24, please change "it" to --air--.
In Column 2, Line 32, please change "bilevel" to --bi-level--.
In Column 2, Line 39, please change "discharged," to --discharged--.
In Column 4, Line 8, please change "scalability" to --sealability--.
In Column 4, Line 56, please change "includes" to --includes:--.
In Column 5, Lines 1-2, please change "air conditioning" to --air-conditioning--.
In Column 6, Line 16, please change "air conditioning" to --air-conditioning--.
In Column 9, Line 9, change "165" to --155--.
In Column 11, Lines 14-15, change "temperatures adjusting" to --temperature-adjusting--.
In Column 12, Line 18, change "bilevel" to --bi-level--.

Signed and Sealed this
Tenth Day of April, 2018

Andrei Iancu
*Director of the United States Patent and Trademark Office*